United States Patent
Otaka et al.

(10) Patent No.: US 12,369,226 B2
(45) Date of Patent: Jul. 22, 2025

(54) WIRELESS BASE STATION, COMMUNICATION SYSTEM, COMPUTER READABLE STORAGE MEDIUM, CONTROL METHOD, AND WIRELESS COMMUNICATION DEVICE

(71) Applicant: HONDA MOTOR CO., LTD., Tokyo (JP)

(72) Inventors: Masaru Otaka, Saitama (JP); Kosei Tsushima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 796 days.

(21) Appl. No.: 17/518,605

(22) Filed: Nov. 4, 2021

(65) Prior Publication Data
US 2022/0061114 A1  Feb. 24, 2022

Related U.S. Application Data

(63) Continuation of application No. PCT/JP2019/022422, filed on Jun. 5, 2019.

(51) Int. Cl.
*H04W 4/00* (2018.01)
*H04W 88/04* (2009.01)
(Continued)

(52) U.S. Cl.
CPC ............ *H04W 88/04* (2013.01); *H04W 72/25* (2023.01); *H04W 92/08* (2013.01); *H04W 92/18* (2013.01)

(58) Field of Classification Search
None
See application file for complete search history.

(56) References Cited

U.S. PATENT DOCUMENTS 10,051,525 B1 * 8/2018 Marupaduga ......... H04W 36/26
10,085,197 B1 * 9/2018 Mansour ......... H04W 36/00837
(Continued)

FOREIGN PATENT DOCUMENTS

| CN | 104349430 A | 2/2015 |
| CN | 106537813 A | 3/2017 |

(Continued)

OTHER PUBLICATIONS

Office Action issued for counterpart Japanese Application No. 2021-524583, issued by the Japanese Patent Office on Oct. 11, 2022 (drafted on Sep. 30, 2022).

(Continued)

*Primary Examiner* — Bob A Phunkulh

(57) ABSTRACT

There is provided a wireless base station including a connection establishment unit configured to establish a communication connection with a wireless communication device, and a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the communication is not performed with the wireless communication device has passed the first time.

20 Claims, 9 Drawing Sheets

(51) Int. Cl.
   *H04W 72/25*   (2023.01)
   *H04W 92/08*   (2009.01)
   *H04W 92/18*   (2009.01)

(56) References Cited

U.S. PATENT DOCUMENTS

| | | | |
|---|---|---|---|
| 11,012,894 B1* | 5/2021 | Oroskar | H04W 36/0016 |
| 12,019,488 B2* | 6/2024 | Perper | H02J 5/00 |
| 2007/0142058 A1* | 6/2007 | Matsumura | H04W 76/14 |
| | | | 455/67.11 |
| 2011/0021221 A1 | 1/2011 | Kondo | |
| 2012/0314586 A1* | 12/2012 | Yamamoto | H04W 76/20 |
| | | | 370/246 |
| 2012/0322363 A1 | 12/2012 | Tsubouchi | |
| 2014/0328239 A1 | 11/2014 | Takiguchi | |
| 2015/0036579 A1* | 2/2015 | Wu | H04W 4/06 |
| | | | 370/312 |
| 2017/0142653 A1 | 5/2017 | Qi | |
| 2017/0347338 A1* | 11/2017 | Chen | H04W 72/30 |
| 2018/0092017 A1* | 3/2018 | Freda | H04W 76/23 |
| 2018/0213588 A1* | 7/2018 | Wei | H04W 48/08 |
| 2018/0234919 A1* | 8/2018 | Tsuda | H04W 88/04 |
| 2018/0317276 A1* | 11/2018 | Lei | H04W 76/30 |
| 2019/0159102 A1* | 5/2019 | Ryu | H04L 5/0048 |
| 2019/0327611 A1* | 10/2019 | Middelesch | H04W 12/033 |
| 2019/0335518 A1* | 10/2019 | Dimitrovski | H04W 76/30 |
| 2019/0349069 A1* | 11/2019 | Gandikota | H04B 7/15557 |
| 2019/0357177 A1* | 11/2019 | Kuang | H04W 88/04 |
| 2020/0281040 A1* | 9/2020 | Kim | H04W 76/25 |
| 2021/0105066 A1 | 4/2021 | Uchiyama | |
| 2021/0144606 A1* | 5/2021 | Xu | H04W 36/03 |

FOREIGN PATENT DOCUMENTS

| | | |
|---|---|---|
| JP | 2004289734 A | 10/2004 |
| JP | 2011029898 A | 2/2011 |
| JP | 2011029988 A | 2/2011 |
| JP | 2013143672 A | 7/2013 |
| JP | 2013229756 A | 11/2013 |
| JP | 2018191130 A | 11/2018 |
| WO | 2011111214 A1 | 9/2011 |
| WO | 2016079993 A1 | 5/2016 |

OTHER PUBLICATIONS

Office Action issued for counterpart Chinese Application 201980095773. 3, issued by The State Intellectual Property Office of People's Republic of China on May 30, 2023.
International Search Report and (ISA/237) Written Opinion of the International Search Authority for International Patent Application No. PCT/JP2019/022422, mailed by the Japan Patent Office on Aug. 6, 2019.
LG Electronics Inc., Connection establishment of remote UE [online], 3GPP TSG-RAN WG2#91 R2-153788, Aug. 24, 2015, section 2.1, URL:http://www.3gpp.org/ftp/tsg_ran/WG2_RL2/TSGR2_91/Docs/R2-153788.zip.

* cited by examiner

WIRELESS BASE STATION, COMMUNICATION SYSTEM, COMPUTER READABLE STORAGE MEDIUM, CONTROL METHOD, AND WIRELESS COMMUNICATION DEVICE

The contents of the following PCT application are incorporated herein by reference:
NO. PCT/JP2019/022422 filed in WO on Jun. 5, 2019

BACKGROUND

1. Technical Field

The present invention relates to a wireless base station, a communication system, a computer readable storage medium, a control method, and a wireless communication device.

2. Related Art

A movable relay device functioning as a base station has been proposed (for example, see Patent document 1).

PRIOR ART DOCUMENT

Patent Document

[Patent document 1] Japanese Unexamined Patent Application, Publication No. 2011-029988

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
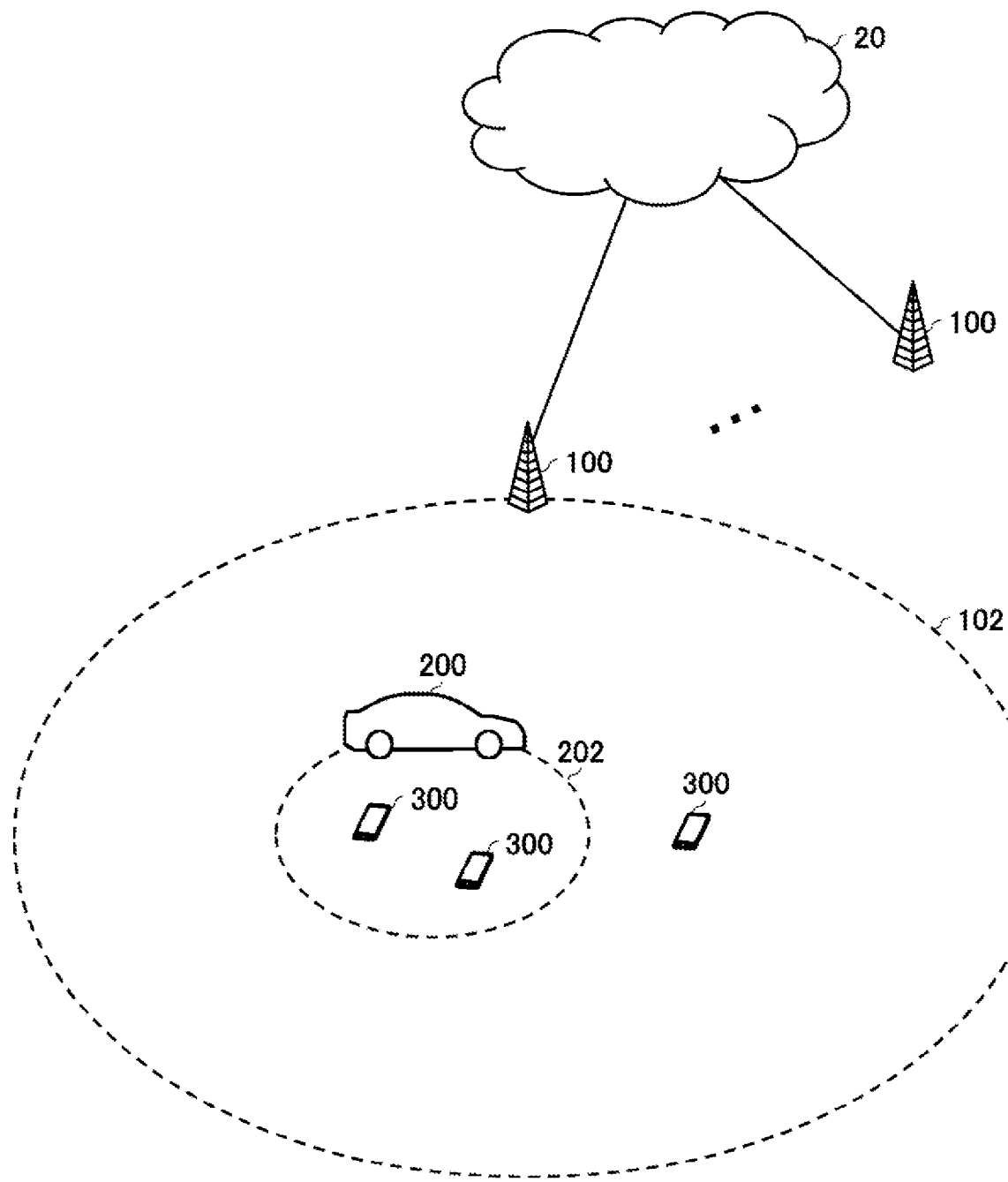
FIG. 1 schematically illustrates one example of a communication system 10.

FIG. 1 schematically illustrates one example of a communication system 10. The communication system 10 includes a wireless base station 100 and a vehicle 200. The vehicle 200 according to the present embodiment is present in an area of a cell 102 of the wireless base station 100 and has a relay function of relaying a communicate between the wireless base station 100 and a communication terminal 300. A state where the vehicle 200 is present in the area of the cell 102 of the wireless base station 100 may be a state where the vehicle 200 is located in the cell 102, and has a wireless communication connection established with the wireless base station 100. The vehicle 200 may be one example of a wireless relay device.

The wireless base station 100 may be compliant with any mobile communication method. The wireless base station 100 is compliant with a 3rd generation (3G) communication method, for example. The wireless base station 100 is compliant with a Long Term Evolution (LTE) communication method, for example. The wireless base station 100 be eNodeB (eNB). In addition, the wireless base station 100 is compliant with a 5th generation (5G) communication method, for example. The wireless base station 100 may be gNodeB (gNB). The wireless base station 100 may be compliant with a mobile communication method of a 6th generation (6G) communication method or a subsequent generation communication method. Herein, a case will be mainly exemplified and described where the wireless base station 100 is compliant with the LTE communication method.

The wireless base station 100 is connected to the network 20. The network 20 includes a mobile communication network. The network 20 may include the Internet.

The vehicle 200 may be a motor vehicle. The vehicle 200 may be any type of motor vehicles as long as the vehicle 200 has a wireless communication function. The vehicle 200 may be, for example, a petrol vehicle, and in addition, may be a so-called eco car. Examples of a type of the eco car includes a hybrid vehicle (HV), a plug-in hybrid vehicle (PHEV/PHV), an electric vehicle (EV), a fuel cell vehicle (FCV), and the like. The vehicle 200 may be a motor vehicle for any purpose. The vehicle 200 may be, for example, a private car, and in addition, may be a business vehicle such as a taxi and a bus.

The communication terminal 300 is, for example, a mobile phone such as a smartphone, a tablet terminal, a wearable terminal, a personal computer (PC), and the like. In addition, the communication terminal 300 may be an Internet of Thing (IoT) terminal.

The vehicle 200 generates, for example, a wireless communication area 202, and executes a wireless communication with the communication terminal 300 present in the wireless communication area 202. A state where the communication terminal 300 is present in the wireless communication area 202 may be a state where the communication terminal 300 is located in the wireless communication area 202 and has a wireless communication connection established with the vehicle 200. It is noted that a state where the communication terminal 300 is present in the wireless communication area 202 generated by the vehicle 200 may be described as a state where the communication terminal 300 is present in an area of the vehicle 200.

A communication method of the wireless communication between the vehicle 200 and the communication terminal 300 may be a cellular communication method. That is, the vehicle 200 may be a mobile base station. In addition, the communication method of the wireless communication between the vehicle 200 and the communication terminal 300 may be a Wi-Fi (registered trademark) communication method. That is, the vehicle 200 may be a movable wireless access point.

The wireless base station 100 according to the present embodiment is configured to control in a manner that, in a case where a wireless communication connection is established with a wireless communication device and a case where the wireless communication device is not a wireless relay device having a relay function, the wireless communication connection with the wireless communication device is released in response to a state where a time during which a communication is not performed with the wireless communication device has passed a first time indicated by a preset timer value. On the other hand, in a case where the wireless communication device is the wireless relay device, the wireless base station 100 is configured not to release the wireless communication connection with the wireless communication device even when the time during which the communication is not performed with the wireless communication device has passed the first time.

For example, in a case where the wireless communication device with which the wireless communication connection is established is the wireless relay device, the wireless base station 100 is configured to change the timer value to indicate a second time which is longer than the first time. With this configuration, in a case where the wireless communication device with which the wireless communication connection is established is the wireless relay device, the time until the wireless communication connection is to be released can be lengthened as compared with a case where the wireless communication device is not the wireless relay device.

In addition, for example, in a case where the wireless communication device with which the wireless communication connection is established is the wireless relay device, the wireless base station 100 is configured to set the timer value as an infinite length. With this configuration, in a case where the wireless communication device with which the wireless communication connection is established is the wireless relay device, it is possible to set such that the wireless communication connection is not released due to a state where the time during which the communication is not performed has continued.

A conventional wireless base station controls in a manner that irrespective of a type of the wireless communication device, in response to a state where a time during which a communication is not performed has passed a time indicated by a preset timer value, a wireless communication connection with the wireless communication device is released. Specifically, the conventional wireless base station transmits Radio Resource Control (RRC) Connection Release to the wireless communication device in response to a state where the time during which the communication is not performed has passed the time indicated by the timer value, and releases the wireless communication connection.

In a case where the wireless communication device is the wireless relay device, a plurality of the communication terminals 300 may be present in an area of the wireless communication device. In a state where the plurality of communication terminals 300 are present in the area, when the wireless communication connection between the wireless relay device and the wireless base station is released, a C-plane signal is transmitted plural times from each of the plurality of communication terminals 300, and a processing load of the wireless relay device may be excessively increased. In addition, a communication delay may occur in the plurality of communication terminals 300, and a sensory quality of a user who uses the communication terminal 300 may be degraded. In contrast, in accordance with the wireless base station 100 according to the present embodiment, in a case where the wireless communication device is the wireless relay device, the timer value is lengthened, or the timer value is set as the infinite length, occurrence of the above-described events can be suppressed or avoided.

Figure 2:
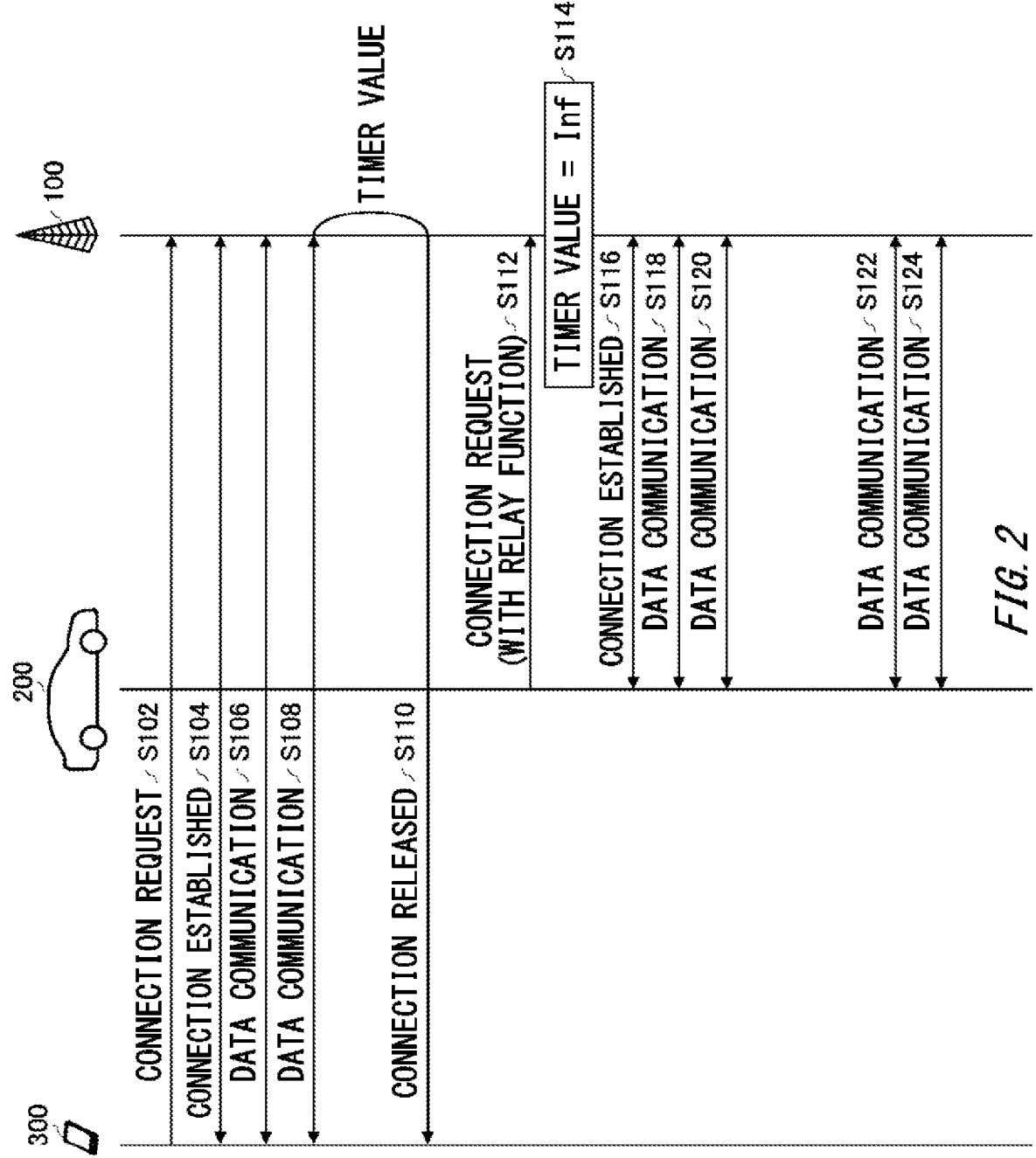
FIG. 2 schematically illustrates one example of a flow of processing among each of a wireless base station 100, a communication terminal 300, and a vehicle 200.

FIG. 2 schematically illustrates one example of a flow of processing among each of the wireless base station 100, the communication terminal 300, and the vehicle 200.

In step (step may be abbreviated and described as S) 102, the communication terminal 300 transmits a connection request to the wireless base station 100. In S104, the communication terminal 300 and the wireless base station 100 establish a wireless communication connection.

In S106, a data communication is performed between the communication terminal 300 and the wireless base station 100. In 108, a data communication is performed between the communication terminal 300 and the wireless base station 100. In S110, the wireless base station 100 transmits a connection release to the communication terminal 300 in response to a state where a time during which the communication is not performed between the wireless base station 100 and the communication terminal 300 has passed a time indicated by a timer value. With this configuration, the wireless communication connection between the communication terminal 300 and the wireless base station 100 is released.

In S112, the vehicle 200 transmits a connection request including information indicating that the vehicle 200 itself has a relay function to the wireless base station 100. In S114, the wireless base station 100 sets the timer value for the vehicle 200 as the infinite length or a relatively long period. The relatively long period is a time of approximately 120 minutes but is not limited to this, and may be 30 minutes or longer. In S116, the vehicle 200 and the wireless base station 100 establish a wireless communication connection.

In S118, a data communication is performed between the vehicle 200 and the wireless base station 100. In S120, a data communication is performed between the vehicle 200 and the wireless base station 100. In S122, after a relatively long time has elapsed since the data communication is performed between the vehicle 200 and the wireless base station 100 in S120, a data communication is performed between the vehicle 200 and the wireless base station 100. In S124, a data communication is performed between the vehicle 200 and the wireless base station 100.

In this manner, in a case where the wireless communication device configured to establish a wireless communication connection with the wireless base station 100 is the vehicle 200 having the relay function, when the timer value is set as the infinite length, a setting can be adopted such that the wireless communication connection is not released under a condition that the time during which the data communication is not performed has passed a predetermined time. With this configuration, it is possible to avoid a state where the processing load of the vehicle 200 is excessively increased when the C-plane signal is transmitted plural times from each of the communication terminals 300 or a state where the communication delay occurs in the plurality of communication terminals 300.

FIG. 2 illustrates the example in which the vehicle 200 includes the information indicating that the vehicle 200 itself has the relay function in the connection request, but the configuration is not limited to this. In a case where the vehicle 200 can turn on and off the relay function, when the relay function is turned on, the vehicle 200 may notify the wireless base station 100 of that effect.

Figure 3:
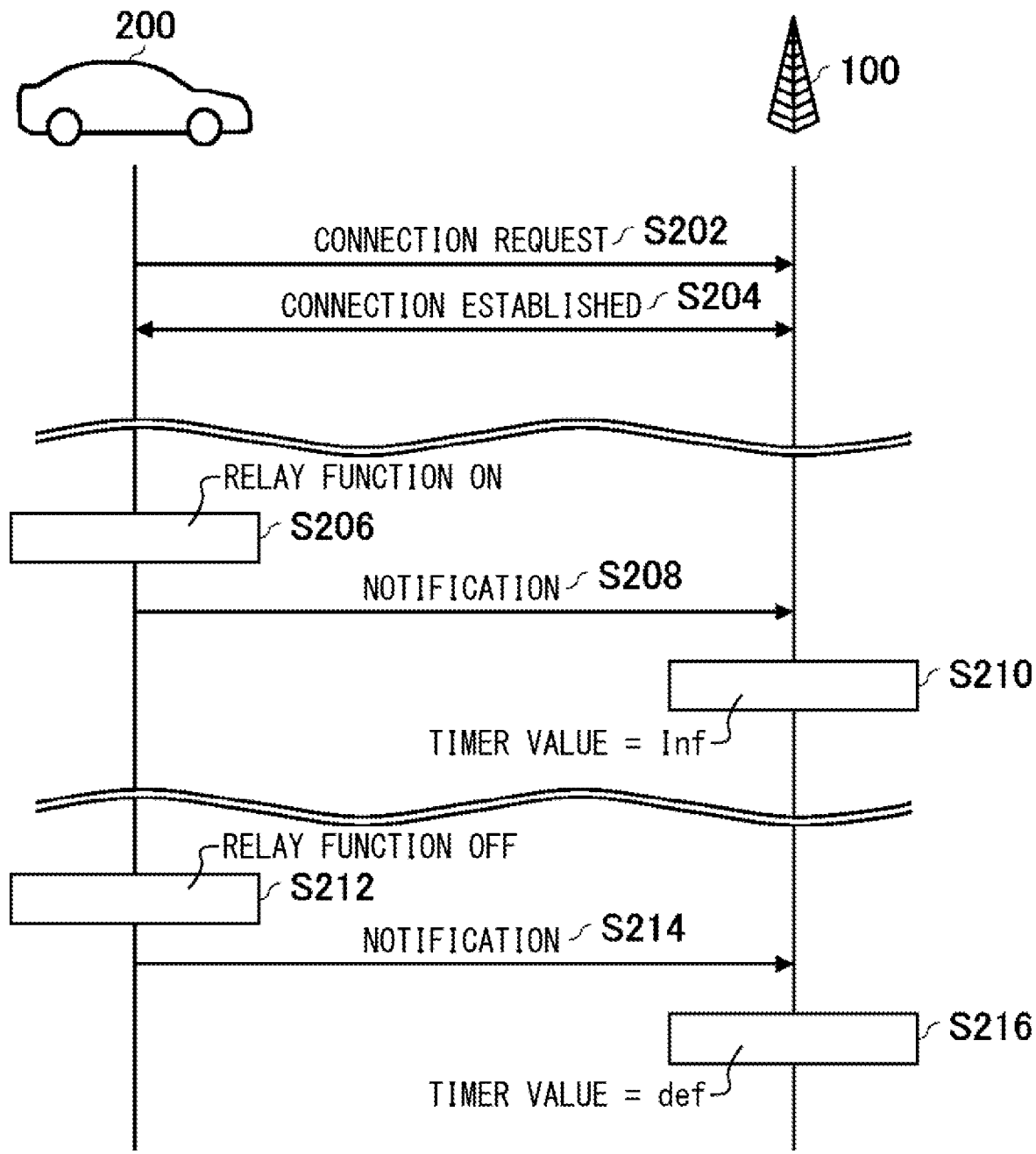
FIG. 3 schematically illustrates one example of a flow of the processing by the vehicle 200 and the wireless base station 100.

FIG. 3 schematically illustrates one example of a flow of the processing by the vehicle 200 and the wireless base station 100. Herein, a description will be provided while a state where the relay function of the vehicle 200 is off is set as a start state.

In S202, the vehicle 200 transmits a connection request to the wireless base station 100. In S204, the vehicle 200 and the wireless base station 100 establish a wireless communication connection.

In S206, the vehicle 200 turns on the relay function. In S208, the vehicle 200 notifies the wireless base station 100 that the relay function is turned on. The vehicle 200 may perform the notification by any method. For example, the vehicle 200 transmits a message indicating that the relay function is turned on to the wireless base station 100. In addition, the vehicle 200 may include information indicating that the relay function is turned on in Measurement Report (which may be referred to as MR) to be transmit to the wireless base station 100. In S210, the wireless base station 100 sets a timer value for the vehicle 200 as the infinite length.

In S212, the vehicle 200 turns off the relay function. In S214, the vehicle 200 notifies the wireless base station 100 that the relay function is turned off. The vehicle 200 may perform the notification by any method. For example, the vehicle 200 transmits a message indicating that the relay function is turned off to the wireless base station 100. In addition, the vehicle 200 may include information indicating that the relay function is turned off in MR to be transmitted to the wireless base station 100. In S214, the wireless base station 100 sets the timer value for the vehicle 200 as a default value.

Figure 4:
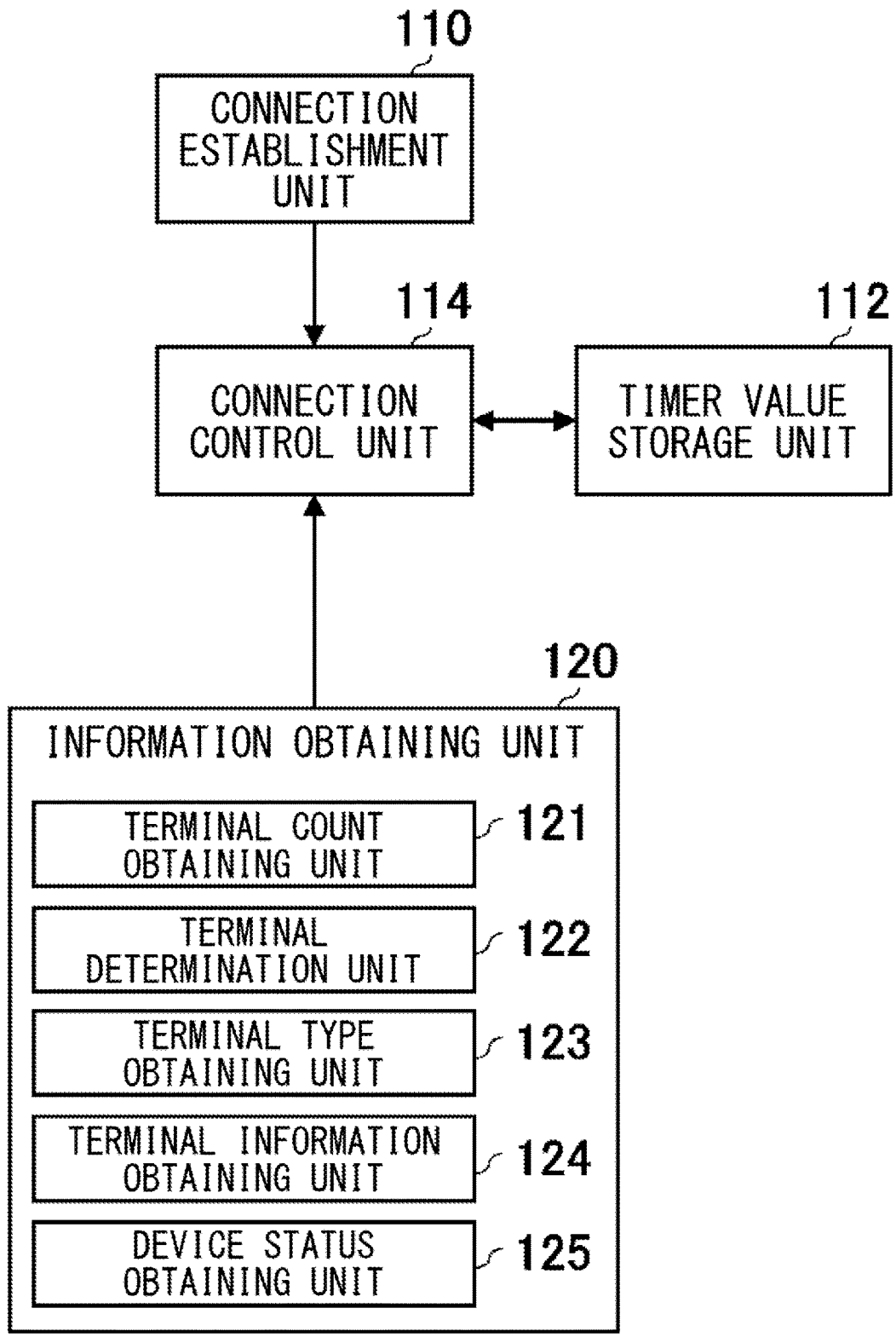
FIG. 4 schematically illustrates one example of a functional configuration of the wireless base station 100.

FIG. 4 schematically illustrates one example of a functional configuration of the wireless base station 100. The wireless base station 100 includes a connection establishment unit 110, a timer value storage unit 112, a connection control unit 114, and an information obtaining unit 120.

The connection establishment unit 110 is configured to establish a wireless communication connection with the wireless communication device. The connection establishment unit 110 may have a wireless communication connection established with the wireless communication device in response to a connection request received from the wireless communication device.

The timer value storage unit 112 is configured to store a timer value. The timer value storage unit 112 may store a timer value for each connection target. The timer value may be a timer value for comparison with a time during which the communication is not performed with the wireless communication device with which the wireless communication connection is established.

As a specific example, the timer value storage unit 112 stores a timer value for RRC Connection Release. In addition, the timer value storage unit 112 may store a timer value for UE Context Release. In addition, the timer value storage unit 112 may store a timer value for Discontinuous Reception (DRX).

As a default value of the timer value for UE Context Release, for example, any value such as 1 second may be set. As a default value of the timer value for DRX, for example, any value such as 5 seconds which is longer than the timer value for UE Context Release may be set. As a default value of the timer value for RRC Connection Release, for example, any value such as 10 seconds which is longer than the timer value for DRX may be set.

The connection control unit 114 is configured to perform a control related to the wireless communication connection established with the wireless communication device by the connection establishment unit 110. In response to a state where a time (which may be referred to as a noncommunication time) during which the communication is not performed between the wireless base station 100 and the wireless communication device has passed the time indicated by the timer value stored in the timer value storage unit 112, the connection control unit 114 performs the control to release the wireless communication connection.

In a case where, for example, the noncommunication time has passed the time indicated by the timer value for UE Context Release, the connection control unit 114 transmits UE Context Release Request to Mobility Management Entity (MME). In addition, in a case where, for example, the noncommunication time has passed the time indicated by the timer value for DRX, the connection control unit 114 causes the wireless communication device to shift to non Active Time. In addition, in a case where, for example, the noncommunication time has passed the time indicated by the timer value for RRC Connection Release, the connection control unit 114 transmits RRC Connection Release to the wireless communication device.

The information obtaining unit 120 is configured to obtain various types of information. The connection control unit 114 may perform the control related to the wireless communication connection established with the wireless communication device by the connection establishment unit 110 based on the information obtained by the information obtaining unit 120. For example, the connection control unit 114 changes the timer value stored in the timer value storage unit 112 based on the information obtained by the information obtaining unit 120. The connection control unit 114 lengthens the length of the timer value based on, for example, the information obtained by the information obtaining unit 120. As a specific example, the connection control unit 114 changes the timer value for UE Context Release from 1 second to 10 seconds, changes the timer value for DRX from 5 seconds to 50 seconds, and changes the timer value for UE Context Release from 10 seconds to 100 seconds. The length to be changed may be any length.

The information obtaining unit 120 includes a terminal count obtaining unit 121, a terminal determination unit 122, a terminal type obtaining unit 123, a terminal information obtaining unit 124, and a device status obtaining unit 125. It is not necessarily imperative for the information obtaining unit 120 to include all of these configurations.

In a case where the wireless communication device having the connection established by the connection establishment unit 110 is the wireless relay device, the terminal count obtaining unit 121 is configured to obtain the number of the communication terminals 300 having the wireless communication connection established with the wireless communication device. In a case where the number of the communication terminals 300 having the wireless communication connection established with the wireless communication device is changed, the terminal count obtaining unit 121 may obtain the number of the communication terminals 300 after the change. The terminal count obtaining unit 121 is notified of the number of the communication terminals 300 from the wireless communication device, for example. The connection control unit 114 may set the timer value stored in the timer value storage unit 112 as a longer value as the number of the communication terminals 300 is higher.

In a case where the wireless communication device having the connection established by the connection establishment unit 110 is the wireless relay device, the terminal determination unit 122 is configured to determine whether the communication terminal 300 having the wireless communication connection established with the wireless communication device is present. The connection control unit 114 may control in a manner that, in a case where the wireless communication device is the wireless relay device and also the communication terminal 300 having the wireless communication connection established with the wireless communication device is present, the connection with the wireless communication device is not released even when the time during which the communication is not performed with the wireless communication device has passed the first time, and in a case where the wireless communication device is the wireless relay device and also the communication terminal 300 having the wireless communication connection established with the wireless communication device is absent, the connection with the wireless communication device is released in response to a state where the time during which the communication is not performed with the wireless communication device has passed the first time.

In a case where the wireless communication device having the connection established by the connection establishment unit 110 is the wireless relay device, the terminal type obtaining unit 123 is configured to obtain a type of the communication terminal 300 having the wireless communication connection established with the wireless communication device. The terminal type obtaining unit 123 receives a notification of the type of the communication terminal 300 from the wireless communication device, for example. The connection control unit 114 may control in a manner that, in a case where the wireless communication device is the wireless relay device and also the type of the communication terminal 300 is a predetermined type, the connection with the wireless communication device is not released even when the time during which the communication is not performed with the wireless communication device has passed the first time, and in a case where the wireless communication device is the wireless relay device and also the type of the communication terminal 300 is not the predetermined type, the connection with the wireless communication device is released in response to a state where the time during which the communication is not performed with the wireless communication device has passed the first time. The predetermined type may be a type registered as a type causing a larger negative impact when the communication is terminated as compared with a smartphone or the like. Examples of the predetermined type include, for example, an automated driving vehicle controlled by a communication, a remote medical equipment controlled by a communication, and the like.

In a case where the wireless communication device having the connection established by the connection establishment unit 110 is the wireless relay device, the terminal information obtaining unit 124 is configured to obtain operation status of the communication terminal 300 having the wireless communication connection established with the wireless communication device. The terminal information obtaining unit 124 receives a notification of the operation status of the communication terminal 300 from the vehicle 200, for example. The connection control unit 114 may control in a manner that, in a case where the wireless communication device is the wireless relay device and also the operation status of the communication terminal 300 is a predetermined state, the connection with the wireless communication device is not released even when the time during which the communication is not performed with the wireless communication device has passed the first time, and in a case where the wireless communication device is the wireless relay device and also the operation status of the communication terminal 300 is not the predetermined state, the connection with the wireless communication device is released in response to a state where the time during which the communication is not performed with the wireless communication device has passed the first time. The predetermined state may be a state registered as a state causing a larger negative impact when the communication is terminated as compared with a data communication by the smartphone or the like. Examples of the predetermined state include an automated driving state of the automated driving vehicle, a state where the remote medical equipment is remotely controlled, and the like.

In a case where the wireless communication device having the connection established by the connection establishment unit 110 is the wireless relay device, the device status obtaining unit 125 is configured to obtain operation status of the wireless communication device. The device status obtaining unit 125 receives a notification of the operation status of the wireless communication device from the wireless communication device, for example. The connection control unit 114 may control in a manner that, in a case where the wireless communication device is the wireless relay device and also the operation status of the wireless communication device is a predetermined state, the connection with the wireless communication device is not released even when the time during which the communication is not performed with the wireless communication device has passed the first time, and in a case where the wireless communication device is the wireless relay device and also the operation status of the wireless communication device is not the predetermined state, the connection with the wireless communication device is released in response to a state where the time during which the communication is not performed with the wireless communication device has passed the first time. The predetermined state may be a state registered as a desirable state for the wireless communication device to execute the relay function. Examples of the predetermined state include a state where the vehicle 200 stops in a case where the wireless communication device is the vehicle 200. In addition, examples of the predetermined state include a state where the vehicle 200 is being charged in a case where the wireless communication device is the vehicle 200 to which a battery is mounted.

In a case where the connection request received from the wireless communication device includes the information indicating that the wireless communication device is the wireless relay device, the connection control unit 114 may determine that the wireless communication device is the wireless relay device, and in a case where the connection request does not include the information, the connection control unit 114 may determine that the wireless communication device is not the wireless relay device. In addition, in a case where the measurement report of the radio wave received by the wireless communication device which is received from the wireless communication device includes information indicating that the wireless communication device is the wireless relay device, the connection control unit 114 may determine that the wireless communication device is the wireless relay device, and in a case where the measurement report does not include the information, the connection control unit 114 may determine that the wireless communication device is not the wireless relay device.

Figure 5:
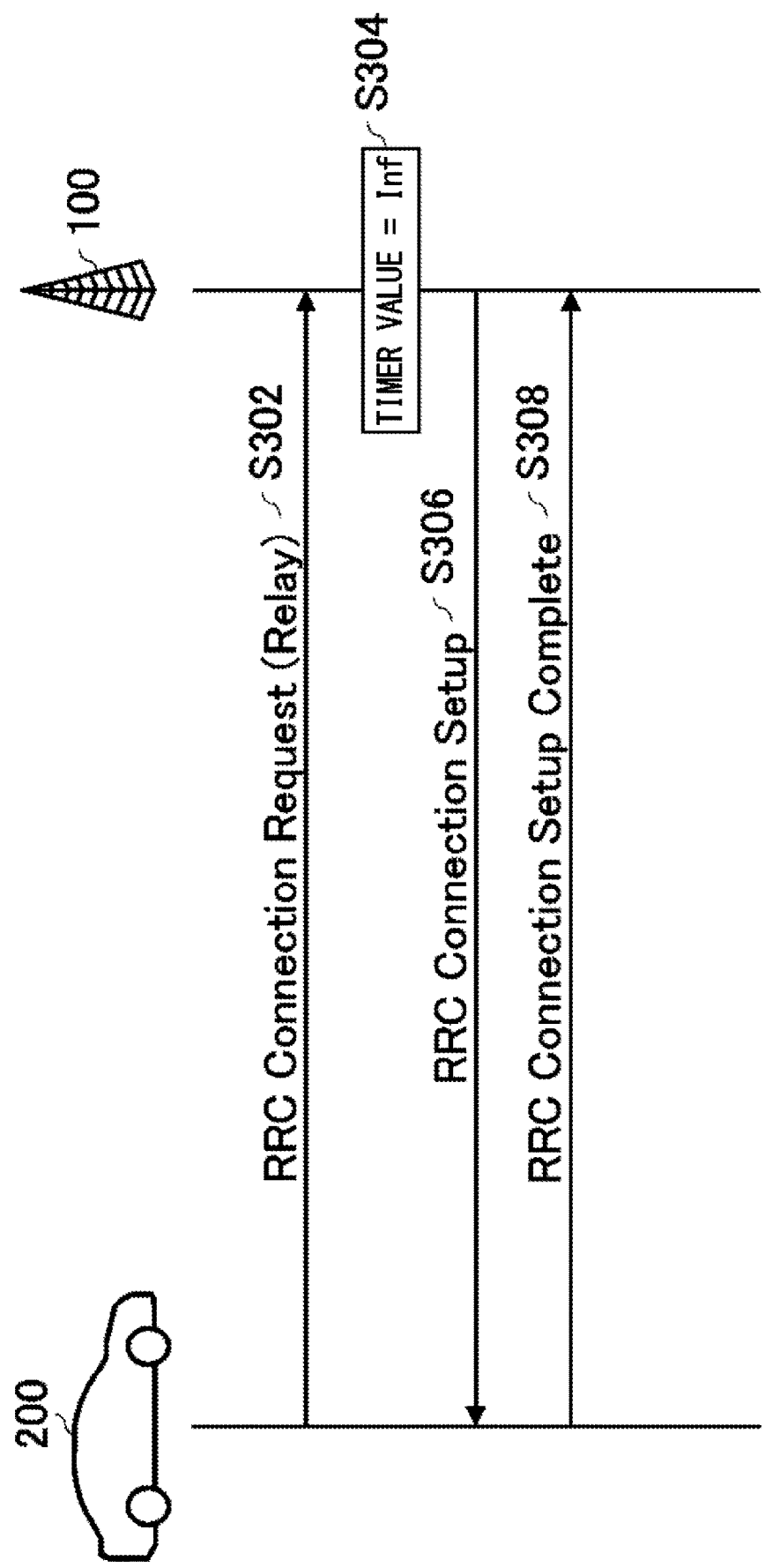
FIG. 5 schematically illustrates one example of the flow of the processing by the vehicle 200 and the wireless base station 100.

FIG. 5 schematically illustrates one example of the flow of the processing by the vehicle 200 and the wireless base station 100. Here, a case will be exemplified and described where the vehicle 200 and the wireless base station 100 communicate with each other by a message compliant with RRC, but the vehicle 200 and the wireless base station 100 may communicate with each other by a message compliant with a standard other than RRC.

In S302, the vehicle 200 transmits RRC Connection Request including "Relay" indicating that the vehicle 200 has the relay function to the wireless base station 100. In S304, in response to reception of RRC Connection Request including "Relay", the wireless base station 100 sets the timer value for the vehicle 200 serving as a transmission source as the infinite length.

In S306, the wireless base station 100 transmits RRC Connection Setup to the vehicle 200. In S308, the vehicle 200 transmits RRC Connection Setup Complete to the wireless base station 100. As a result of the of the processing, the wireless communication connection between the vehicle 200 and the wireless base station 100 is established.

Figure 6:
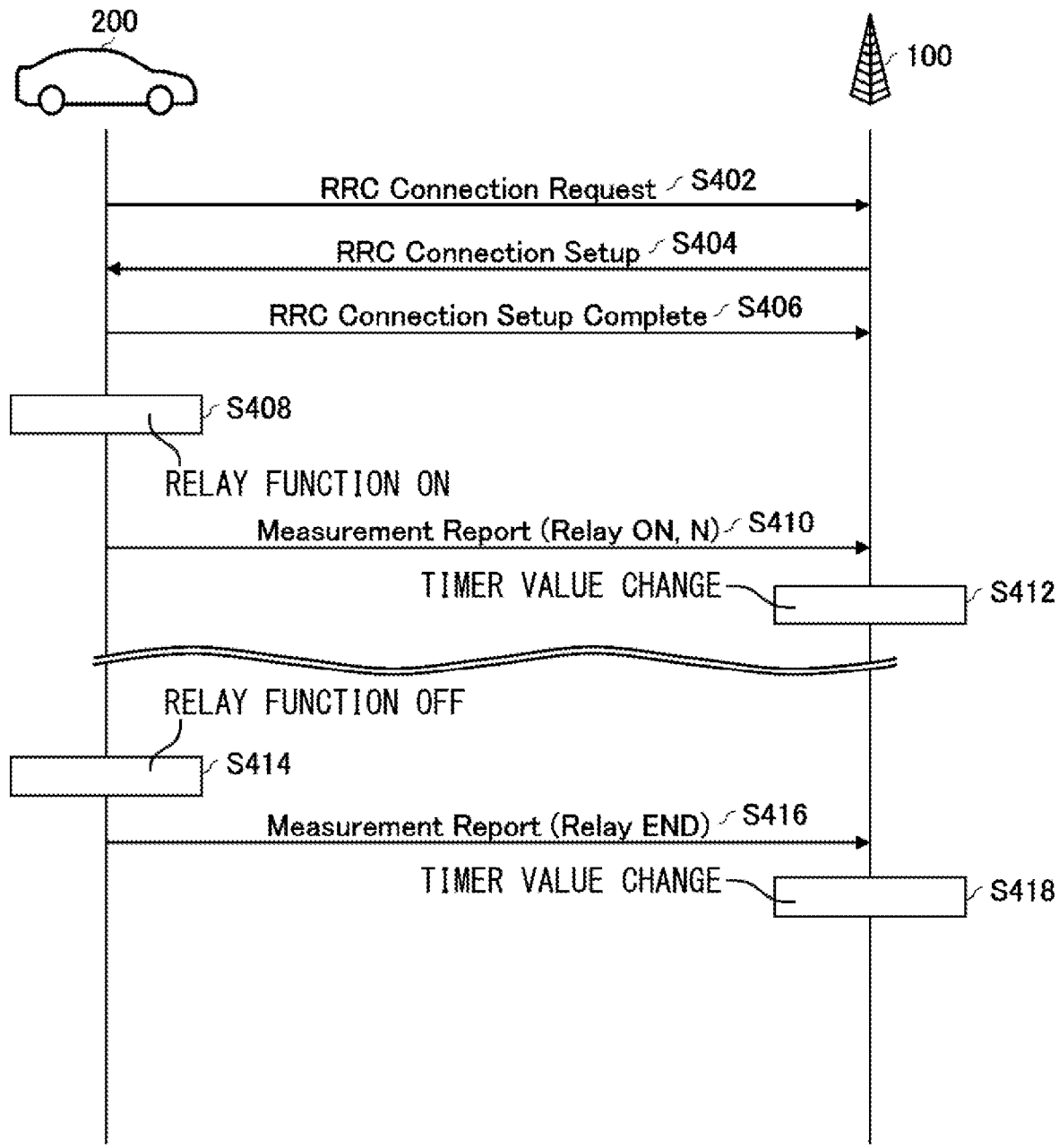
FIG. 6 schematically illustrates one example of the flow of the processing by the vehicle 200 and the wireless base station 100.

FIG. 6 schematically illustrates one example of the flow of the processing by the vehicle 200 and the wireless base station 100. Here too, a case will be exemplified and described where the vehicle 200 and the wireless base station 100 communicate with each other by a message compliant with RRC, but the vehicle 200 and the wireless base station 100 may communicate with each other by a message compliant with a standard other than RRC.

In S402, the vehicle 200 transmits RRC Connection Request to the wireless base station 100. In S404, the wireless base station 100 transmits RRC Connection Setup to the vehicle 200. In S406, the vehicle 200 transmits RRC Connection Setup Complete to the wireless base station 100. As a result of the processing, the wireless communication connection between the vehicle 200 and the wireless base station 100 is established.

In S408, the vehicle 200 turns on the relay function. One or more of the communication terminals 300 are present in the area of the vehicle 200. In S410, the vehicle 200 includes "Relay ON" indicating that the relay function is turned on and "N" indicating the number of the communication terminals 300 present in the area of the vehicle 200 in Measurement Report to be transmitted to the wireless base station 100.

In S412, the wireless base station 100 changes the timer value corresponding to the vehicle 200 in response to the inclusion of "Relay ON" in Measurement Report received in S410. The wireless base station 100 may change the timer value to indicate a longer time as the number of "N" indicating the number of the communication terminals 300 present in the area of the vehicle 200 is higher.

In S414, the vehicle 200 turns off the relay function. In S416, the vehicle 200 includes "Relay END" indicating that the relay function is turned off in Measurement Report to be transmitted to the wireless base station 100. In S418, the wireless base station 100 changes the timer value corresponding to the vehicle 200 in response to the reception of Measurement Report including "Relay END" in S416. The wireless base station 100 may change the timer value corresponding to the vehicle 200 to a default value.

According to the above-described embodiment, the case has been exemplified and described where the wireless base station 100 sets the timer value for the wireless communication device serving as the wireless relay device to be longer or sets the timer value as the infinite length, so that it becomes difficult to release the wireless communication connection between the wireless base station 100 and the wireless communication device, or the wireless communication connection is not released. However, the configuration is not limited to this, and the wireless communication device serving as the wireless relay device may execute such processing that it becomes difficult to release the wireless communication connection between the wireless base station 100 and the wireless communication device, or the wireless communication connection is not released.

Figure 7:
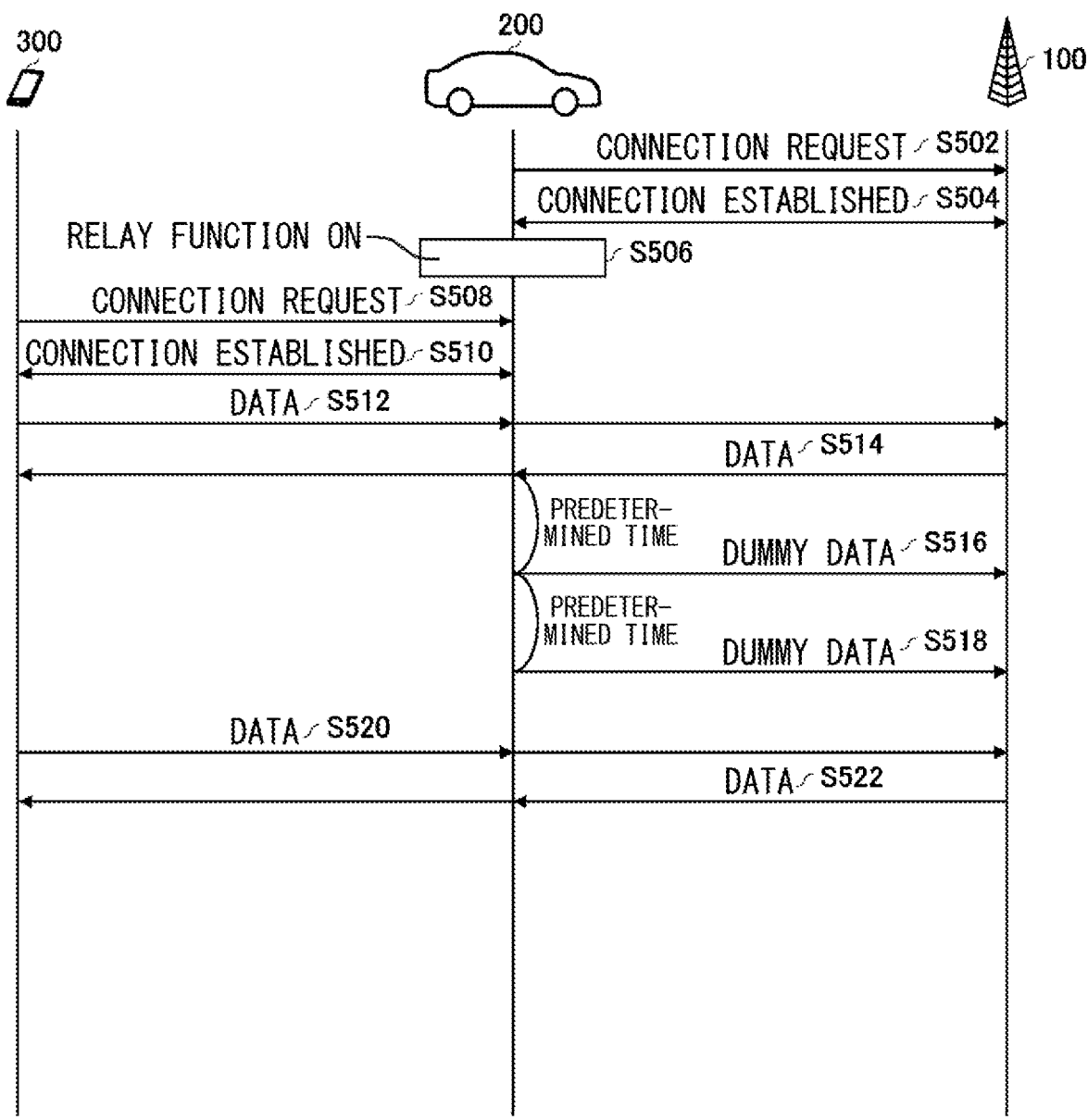
FIG. 7 schematically illustrates one example of the flow of the processing by the vehicle 200 and the wireless base station 100.

FIG. 7 schematically illustrates one example of the flow of the processing by the vehicle 200 and the wireless base station 100. In S502, the vehicle 200 transmits a connection request to the wireless base station 100. In S504, the vehicle 200 and the wireless base station 100 establish a wireless communication connection. In S506, the vehicle 200 turns on the relay function.

In S508, the communication terminal 300 transmits a connection request to the vehicle 200. In S510, the communication terminal 300 and the vehicle 200 establish a wireless communication connection. In S512 and S514, the communication terminal 300 performs a data communication with the wireless base station 100 via the vehicle 200.

After the vehicle 200 performs data relay in S514, the vehicle 200 transmits dummy data to the wireless base station 100 in S516 in response to a state where a predetermined time has passed while no data is received from the communication terminal 300 or the wireless base station 100. After the vehicle 200 transmits the dummy data to the wireless base station 100 in S516, the vehicle 200 transmits dummy data to the wireless base station 100 in S518 in response to a state where a predetermined time has passed while no data is received from the communication terminal 300 or the wireless base station 100. In S520 and S522, the communication terminal 300 performs a data communication with the wireless base station 100 via the vehicle 200.

As illustrated in FIG. 7, in a case where a time during which the vehicle 200 does not relay the communication between the communication terminal 300 and the wireless base station 100 has passed the predetermined time, the vehicle 200 transmits the dummy data to the wireless base station 100, so that it is possible to avoid the release of the connection by the wireless base station 100 when the time during which the communication is not performed between the wireless base station 100 and the vehicle 200 has passed the time indicated by the timer value. The predetermined time may be optionally set to indicate a time which is shorter than the timer value set in the wireless base station 100. After the wireless communication connection is established with the wireless base station 100, for example, the vehicle 200 may measure a time since the communication is performed last time with the wireless base station 100 until a connection release is received from the wireless base station 100, and set a time which is shorter than the measured time as the predetermined time.

Figure 8:
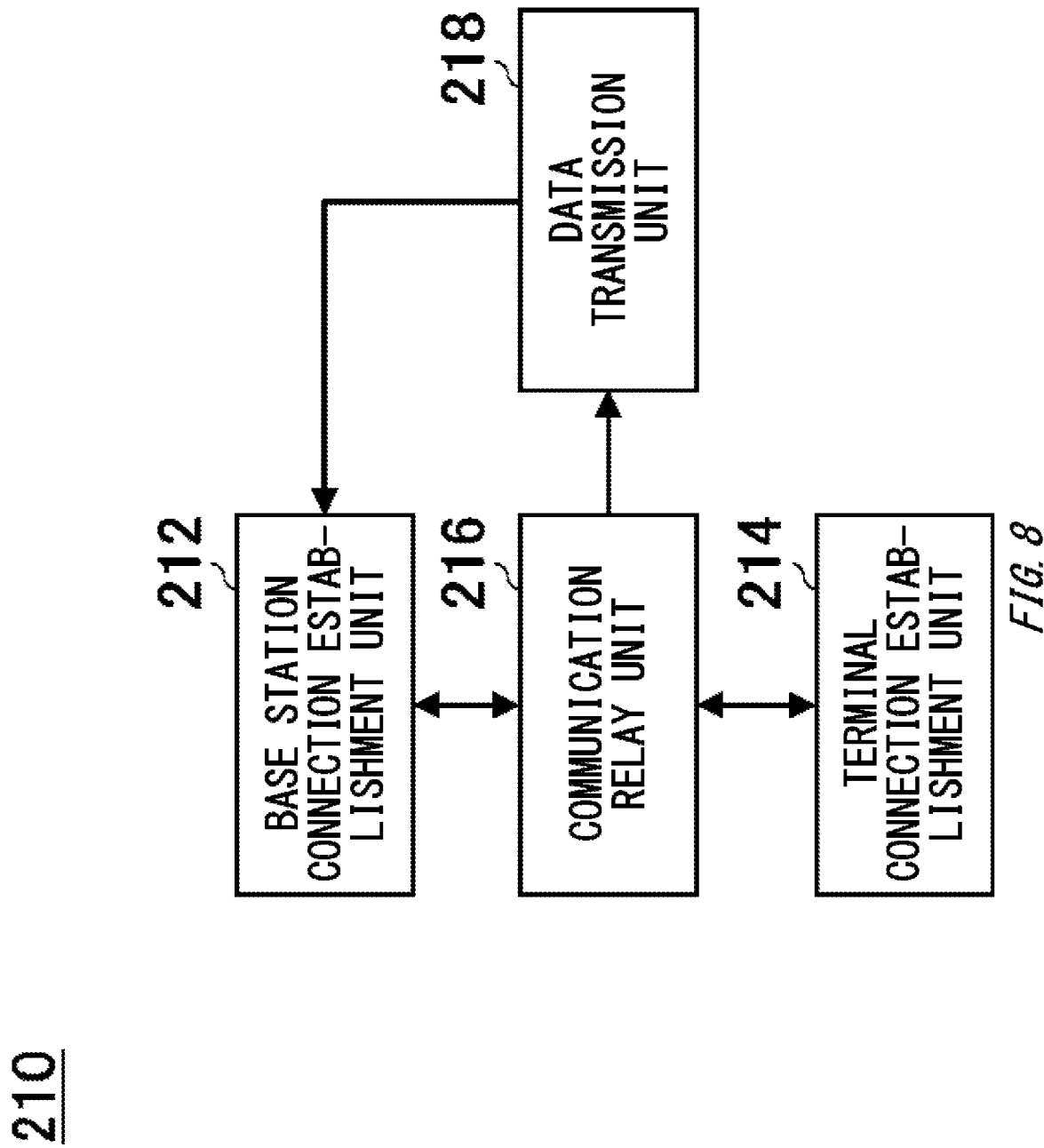
FIG. 8 schematically illustrates one example of a functional configuration of an in-vehicle device 210.

FIG. 8 schematically illustrates one example of a functional configuration of an in-vehicle device 210. The in-vehicle device 210 can be mounted to the vehicle 200. The in-vehicle device 210 includes a base station connection establishment unit 212, a terminal connection establishment unit 214, a communication relay unit 216, and a data transmission unit 218.

The base station connection establishment unit 212 is configured to establish a wireless communication connection with the wireless base station 100. The terminal connection establishment unit 214 is configured to establish a wireless communication connection with the communication terminal 300. The communication relay unit 216 is configured to relay a communication between the wireless base station 100 and the communication terminal 300.

In a case where a time during which the communication between the communication terminal 300 and the wireless base station 100 is not relayed has passed the first time, even when data is not received from the communication terminal 300, the data transmission unit 218 is configured to transmit data to the wireless base station 100. The data transmission unit 218 may transmit dummy data to the wireless base station 100. The dummy data transmitted by the data transmission unit 218 may be any data as long as the wireless base station 100 can be caused to determine that the data communication between the wireless base station 100 and the vehicle 200 continues.

The data transmission unit 218 may transmit, for example, data in which a higher layer of the wireless base station 100 is set as a destination to the wireless base station 100 as the dummy data. The data transmission unit 218 may transmit data in which any device located at a higher layer of the wireless base station 100 is set as a destination to the wireless base station 100. The data transmission unit 218 transmits, for example, data in which any device located in a core network in a mobile communication network in the network 20 is set as the destination to the wireless base station 100. In addition, the data transmission unit 218 may transmit data in which any device connected to the Internet in the network 20 is set as the destination to the wireless base station 100.

The first time may be set, for example, by a designer of the in-vehicle device 210, an occupant of the vehicle 200, and the like. In addition, the first time may be automatically set by the communication relay unit 216. After the wireless communication connection is established with the wireless base station 100, for example, the communication relay unit 216 measures the time since the communication is performed last time with the wireless base station 100 until the connection release is received from the wireless base station 100, and sets a time which is shorter than the measured time as the first time.

Figure 9:
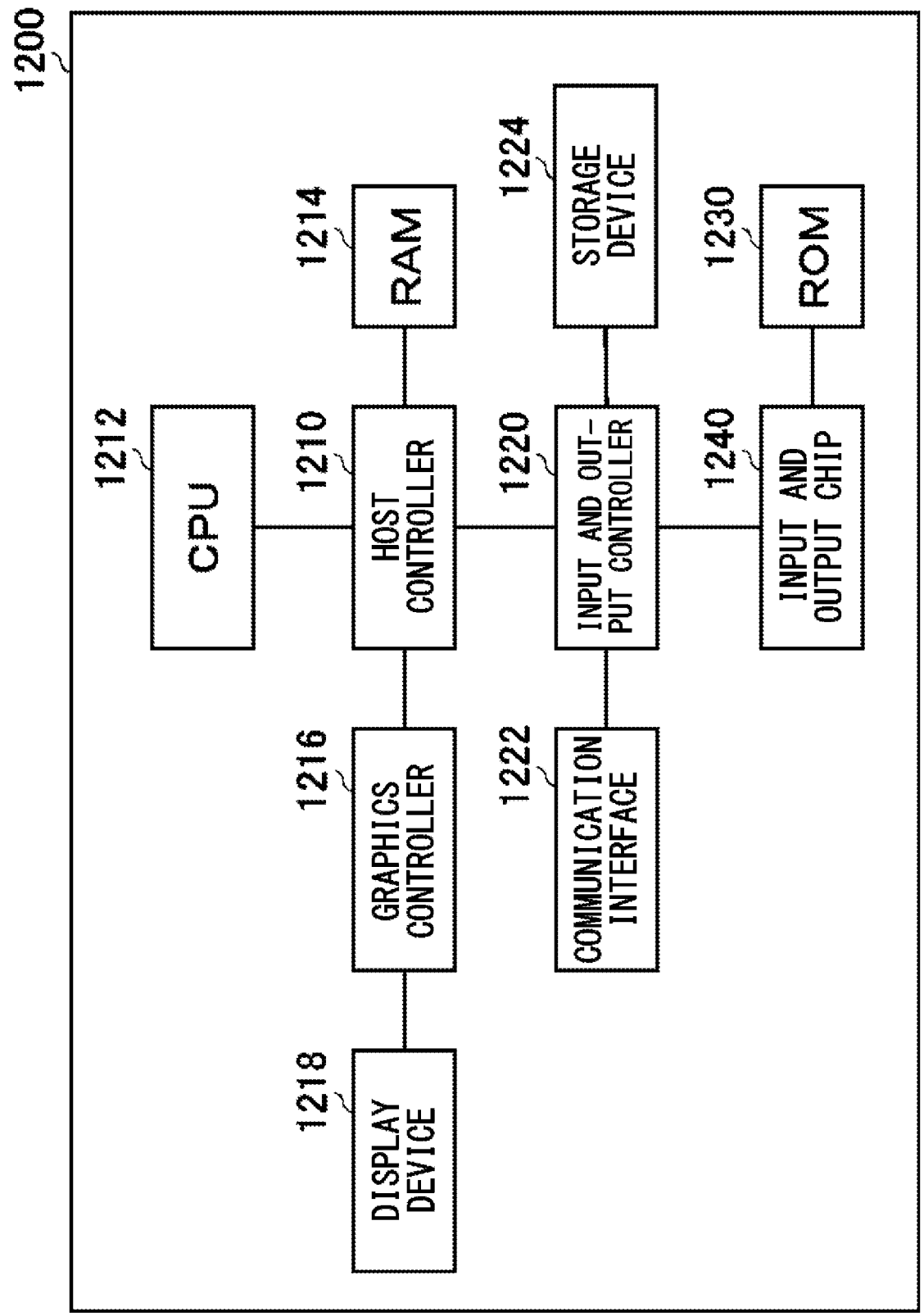
FIG. 9 schematically illustrates one example of a hardware configuration of a computer 1200 functioning as the wireless base station 100.

FIG. 9 schematically illustrates one example of a hardware configuration of a computer 1200 functioning as the wireless base station 100, the in-vehicle device 210, or the communication terminal 300. Programs installed in the computer 1200 can cause the computer 1200 to function as one or more "units" of the apparatuses according to the present embodiment or can cause the computer 1200 to execute operations associated with the apparatuses according to the present embodiment or the one or more "units", and/or can cause the computer 1200 to execute a process according to the present embodiment or steps of the process. Such programs may be executed by a central processing unit (CPU) 1212 in order to cause the computer 1200 to execute a specific operation associated with some or all of the flowchart and the blocks in the block diagrams described in the present specification.

The computer 1200 according to the present embodiment includes the CPU 1212, a RAM 1214, and a graphics controller 1216 which are mutually connected by a host controller 1210. The computer 1200 also includes a communication interface 1222, a storage device 1224, and an input and output unit such as an IC card drive which are connected to the host controller 1210 via an input and output controller 1220. The storage device 1224 may be a hard disk drive, a solid state drive, or the like. The computer 1200 also includes a ROM 1230 and a legacy input and output unit such as a keyboard which are connected to the input and output controller 1220 via an input and output chip 1240.

The CPU 1212 operates according to the programs stored in the ROM 1230 and the RAM 1214, thereby controlling each unit. The graphics controller 1216 is configured to acquire image data generated by the CPU 1212 in a frame buffer or the like provided in the RAM 1214 or in itself, and cause the image data to be displayed on a display device 1218. A configuration may be adopted where the computer 1200 does not include the display device 1218, and in this case, the graphics controller 1216 causes the image data to be displayed on an external display device.

The communication interface 1222 communicates with other electronic devices via a wireless communication network. The storage device 1224 stores programs and data used by the CPU 1212 in the computer 1200. The IC card drive reads programs and data from an IC card, and/or writes programs and data to the IC card.

The ROM 1230 stores therein boot programs or the like executed by the computer 1200 at the time of activation, and/or stores programs depending on hardware of the computer 1200. The input and output chip 1240 may also connect various input and output units to the input and output controller 1220 via a USB port, a parallel port, a serial port, a keyboard port, a mouse port, or the like.

The programs are provided via a computer readable storage medium such as an IC card. The programs are read from a computer readable storage medium, installed in the storage device 1224, the RAM 1214, or the ROM 1230 which is also an example of the computer readable storage medium, and executed by the CPU 1212. Information processing written in these programs is read by the computer 1200, and provides cooperation between the programs and the various types of hardware resources described above. An apparatus or a method may be configured by implementing operation or processing of information according to a use of the computer 1200.

For example, when communication is performed between the computer 1200 and an external device, the CPU 1212 may execute a communication program loaded in the RAM 1214, and instruct the communication interface 1222 to execute communication processing based on processing written in the communication program. The communication interface 1222, under the control of the CPU 1212, reads transmission data stored in a transmission buffer processing region provided in a recording medium such as the RAM 1214, the storage device 1224, or the IC card, transmits the read transmission data to the network, or writes reception data received from the network into a reception buffer processing region or the like provided on the recording medium.

In addition, the CPU 1212 may cause all or necessary portion of a file or a database stored in the external recording medium such as the storage device 1224 or the IC card, to be read by the RAM 1214, and execute various types of processing on the data on the RAM 1214. Next, the CPU 1212 may write back the processed data into the external recording medium.

Various types of programs and various types of information such as data, a table, and a database may be stored in the recording medium, and subjected to information processing. The CPU 1212 may execute, on the data read from the RAM 1214, various types of processing including various types of operations, information processing, conditional judgement, conditional branching, unconditional branching, information retrieval/replacement, or the like described in any part in the present disclosure and specified by instruction sequences of the programs, and writes back the results into the RAM 1214. In addition, the CPU 1212 may retrieve information in a file, a database, or the like in the recording medium. For example, when a plurality of entries each having an attribute value of a first attribute associated with an attribute value of a second attribute are stored in the recording medium, the CPU 1212 may retrieve, out of the plurality of entries, an entry with the attribute value of the first attribute specified that meets a condition, read the attribute value of the second attribute stored in the entry, and thereby acquire the attribute value of the second attribute associated with the first attribute meeting a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, so that the programs are provided to the computer 1200 via the network.

The flowchart and the blocks in the block diagrams according to the present embodiment may represent a step of a process in which an operation is executed or a "unit" of an apparatus which has a role of executing an operation. A specific step and "unit" may be implemented by a dedicated circuit, a programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and other logical operations, and a flip-flop, a register, and a memory element, such as a field programmable gate array (FPGA) and a programmable logic array (PLA).

The computer readable storage medium may include any tangible device capable of storing an instruction executed by an appropriate device, so that the computer readable storage medium having the instruction stored thereon constitutes a product including an instruction that may be executed in order to provide means to execute an operation specified by a flowchart or a block diagram. Examples of the computer readable storage medium may include an electronic storage medium, a magnetic storage medium, an optical storage medium, an electromagnetic storage medium, a semiconductor storage medium, or the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer readable instruction may be provided to a general purpose computer, a special purpose computer, or a processor or a programmable circuit of another programmable data processing apparatus locally or via a local area network (LAN), a wide area network (WAN) such as the Internet or the like in order that the general purpose computer, the special purpose computer, or the processor or the programmable circuit of another programmable data processing apparatus is to execute the computer readable instruction to provide means to execute operations specified by the flowchart or the block diagram. Examples of the processor include a computer processor, a processing unit, a microprocessor, a digital signal processor, a controller, a microcontroller, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 communication system, 20 network, 100 wireless base station, 102 cell, 110 connection establishment unit, 112 timer value storage unit, 114 connection control unit, 120 information obtaining unit, 121 terminal count obtaining unit, 122 terminal determination unit, 123 terminal type obtaining unit, 124 terminal information obtaining unit, 125 device status obtaining unit, 200 vehicle, 210 in-vehicle device, 212 base station connection establishment unit, 214 terminal connection establishment unit, 216 communication relay unit, 218 data transmission unit, 300 communication terminal, 1200 computer, 1210 host controller, 1212 CPU, 1214 RAM, 1216 graphics controller, 1218 display device, 1220 input and output controller, 1222 communication interface, 1224 storage device, 1230 ROM, 1240 input and output chip.

What is claimed is:
1. A wireless base station comprising:
   a connection establishment unit configured to establish a communication connection with a wireless communication device;
   a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless commu- nication device has passed a first time, and in a case where the wireless communication device is not the wireless relay device, the connection with the wireless communication device is released in response to a state where the time during which the wireless base station and the wireless communication device do not communicate with each other has passed the first time; and a terminal count obtaining unit configured to obtain the number of the communication terminals having a wireless communication connection established with the wireless communication device in a case where the wireless communication device is the wireless relay device, wherein in a case where the wireless communication device is the wireless relay device, the connection control unit is configured to set a timer value for comparison with the time during which the wireless base station and the wireless communication device do not communicate with each other as a second time which is longer than the first time, and the connection control unit is configured to set the timer value as a longer value as the number of the communication terminals is higher.

2. A communication system comprising:

the wireless base station according to claim 1; and the wireless communication device, wherein:

the wireless communication device is a wireless relay device; and the wireless communication device includes a communication relay unit configured to relay a communication between the communication terminal having a wireless communication connection established with the wireless communication device, and the wireless base station, and a data transmission unit configured to transmit, in a case where a time during which the communication between the communication terminal and the wireless base station is not relayed has passed a second time which is shorter than the first time, data to the wireless base station even when data is not received from the communication terminal.

3. A wireless base station comprising:

a connection establishment unit configured to establish a communication connection with a wireless communication device;

a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and a terminal determination unit configured to determine whether the communication terminal having the wireless communication connection established with the wireless communication device is present in a case where the wireless communication device is the wireless relay device, wherein the connection control unit is configured to control in a manner that, in a case where the wireless communication device is the wireless relay device and also the communication terminal having the wireless communication connection established with the wireless communication device is present, the connection with the wireless communication device is not released even when the time during which the communication is not performed with the wireless communication device has passed the first time, and in a case where the wireless communication device is the wireless relay device and also the communication terminal having the wireless communication connection established with the wireless communication device is absent, the connection with the wireless communication device is released in response to a state where the time during which the communication is not performed with the wireless communication device has passed the first time.

4. A communication system comprising:

the wireless base station according to claim 3; and the wireless communication device, wherein:

the wireless communication device is a wireless relay device; and the wireless communication device includes a communication relay unit configured to relay a communication between the communication terminal having a wireless communication connection established with the wireless communication device, and the wireless base station, and a data transmission unit configured to transmit, in a case where a time during which the communication between the communication terminal and the wireless base station is not relayed has passed a second time which is shorter than the first time, data to the wireless base station even when data is not received from the communication terminal.

5. A wireless base station comprising:

a connection establishment unit configured to establish a communication connection with a wireless communication device;

a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and a terminal type obtaining unit configured to obtain a type of the communication terminal having the wireless communication connection established with the wireless communication device in a case where the wireless communication device is the wireless relay device, wherein the connection control unit is configured to control in a manner that, in a case where the wireless communication device is the wireless relay device and also the type of the communication terminal is a predetermined type, the connection with the wireless communication device is not released even when the time during which the communication is not performed with the wireless communication device has passed the first time, and in a case where the wireless communication device is the wireless relay device and also the type of the communication terminal is not the predetermined type, the connection with the wireless communication device is released in response to a state where the time during which the communication is not performed with the wireless communication device has passed the first time.

6. A communication system comprising:
the wireless base station according to claim 5; and
the wireless communication device, wherein:
the wireless communication device is a wireless relay device; and
the wireless communication device includes
a communication relay unit configured to relay a communication between the communication terminal having a wireless communication connection established with the wireless communication device, and the wireless base station, and
a data transmission unit configured to transmit, in a case where a time during which the communication between the communication terminal and the wireless base station is not relayed has passed a second time which is shorter than the first time, data to the wireless base station even when data is not received from the communication terminal.

7. A wireless base station comprising:
a connection establishment unit configured to establish a communication connection with a wireless communication device;
a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and
a terminal status obtaining unit configured to obtain operation status of the communication terminal having the wireless communication connection established with the wireless communication device in a case where the wireless communication device is the wireless relay device, wherein
the connection control unit is configured to control in a manner that, in a case where the wireless communication device is the wireless relay device and also the operation status of the communication terminal is a predetermined state, the connection with the wireless communication device is not released even when the time during which the communication is not performed with the wireless communication device has passed the first time, and in a case where the wireless communication device is the wireless relay device and also the operation status of the communication terminal is not the predetermined state, the connection with the wireless communication device is released in response to a state where the time during which the communication is not performed with the wireless communication device has passed the first time.

8. A communication system comprising:
the wireless base station according to claim 7; and
the wireless communication device, wherein:
the wireless communication device is a wireless relay device; and
the wireless communication device includes
a communication relay unit configured to relay a communication between the communication terminal having a wireless communication connection established with the wireless communication device, and the wireless base station, and
a data transmission unit configured to transmit, in a case where a time during which the communication between the communication terminal and the wireless base station is not relayed has passed a second time which is shorter than the first time, data to the wireless base station even when data is not received from the communication terminal.

9. A wireless base station comprising:
a connection establishment unit configured to establish a communication connection with a wireless communication device;
a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and
a device status obtaining unit configured to obtain operation status of the wireless communication device in a case where the wireless communication device is the wireless relay device, wherein
the connection control unit is configured to control in a manner that, in a case where the wireless communication device is the wireless relay device and also the operation status of the wireless communication device is a predetermined state, the connection with the wireless communication device is not released even when the time during which the communication is not performed with the wireless communication device has passed the first time, and in a case where the wireless communication device is the wireless relay device and also the operation status of the wireless communication device is not the predetermined state, the connection with the wireless communication device is released in response to a state where the time during which the communication is not performed with the wireless communication device has passed the first time.

10. A communication system comprising:
the wireless base station according to claim 9; and
the wireless communication device, wherein:
the wireless communication device is a wireless relay device; and
the wireless communication device includes
a communication relay unit configured to relay a communication between the communication terminal having a wireless communication connection established with the wireless communication device, and the wireless base station, and a data transmission unit configured to transmit, in a case where a time during which the communication between the communication terminal and the wireless base station is not relayed has passed a second time which is shorter than the first time, data to the wireless base station even when data is not received from the communication terminal.

11. A non-transitory computer readable storage medium having stored thereon a program that causes a computer to function as:

a wireless base station comprising:

a connection establishment unit configured to establish a communication connection with a wireless communication device;

a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and a terminal count obtaining unit configured to obtain the number of the communication terminals having a wireless communication connection established with the wireless communication device in a case where the wireless communication device is the wireless relay device, wherein in a case where the wireless communication device is the wireless relay device, the connection control unit is configured to set a timer value for comparison with the time during which the wireless base station and the wireless communication device do not communicate with each other as a second time which is longer than the first time, and the connection control unit is configured to set the timer value as a longer value as the number of the communication terminals is higher.

12. A non-transitory computer readable storage medium having stored thereon a program that causes a computer to function as:

a wireless base station comprising:

a connection establishment unit configured to establish a communication connection with a wireless communication device;

a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and a terminal determination unit configured to determine whether the communication terminal having the wireless communication connection established with the wireless communication device is present in a case where the wireless communication device is the wireless relay device, wherein the connection control unit is configured to control in a manner that, in a case where the wireless communication device is the wireless relay device and also the communication terminal having the wireless communication connection established with the wireless communication device is present, the connection with the wireless communication device is not released even when the time during which the communication is not performed with the wireless communication device has passed the first time, and in a case where the wireless communication device is the wireless relay device and also the communication terminal having the wireless communication connection established with the wireless communication device is absent, the connection with the wireless communication device is released in response to a state where the time during which the communication is not performed with the wireless communication device has passed the first time.

13. A non-transitory computer readable storage medium having stored thereon a program that causes a computer to function as:

a wireless base station comprising:

a connection establishment unit configured to establish a communication connection with a wireless communication device;

a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and a terminal type obtaining unit configured to obtain a type of the communication terminal having the wireless communication connection established with the wireless communication device in a case where the wireless communication device is the wireless relay device, wherein the connection control unit is configured to control in a manner that, in a case where the wireless communication device is the wireless relay device and also the type of the communication terminal is a predetermined type, the connection with the wireless communication device is not released even when the time during which the communication is not performed with the wireless communication device has passed the first time, and in a case where the wireless communication device is the wireless relay device and also the type of the communication terminal is not the predetermined type, the connection with the wireless communication device is released in response to a state where the time during which the communication is not performed with the wireless communication device has passed the first time.

14. A non-transitory computer readable storage medium having stored thereon a program that causes a computer to function as:
a wireless base station comprising:
a connection establishment unit configured to establish a communication connection with a wireless communication device;
a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and
a terminal status obtaining unit configured to obtain operation status of the communication terminal having the wireless communication connection established with the wireless communication device in a case where the wireless communication device is the wireless relay device, wherein
the connection control unit is configured to control in a manner that, in a case where the wireless communication device is the wireless relay device and also the operation status of the communication terminal is a predetermined state, the connection with the wireless communication device is not released even when the time during which the communication is not performed with the wireless communication device has passed the first time, and in a case where the wireless communication device is the wireless relay device and also the operation status of the communication terminal is not the predetermined state, the connection with the wireless communication device is released in response to a state where the time during which the communication is not performed with the wireless communication device has passed the first time.

15. A non-transitory computer readable storage medium having stored thereon a program that causes a computer to function as:
a wireless base station comprising:
a connection establishment unit configured to establish a communication connection with a wireless communication device;
a connection control unit configured to control in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the wireless base station and the wireless communication device do not communicate with each other has passed the first time; and
a device status obtaining unit configured to obtain operation status of the wireless communication device in a case where the wireless communication device is the wireless relay device, wherein
the connection control unit is configured to control in a manner that, in a case where the wireless communication device is the wireless relay device and also the operation status of the wireless communication device is a predetermined state, the connection with the wireless communication device is not released even when the time during which the communication is not performed with the wireless communication device has passed the first time, and in a case where the wireless communication device is the wireless relay device and also the operation status of the wireless communication device is not the predetermined state, the connection with the wireless communication device is released in response to a state where the time during which the communication is not performed with the wireless communication device has passed the first time.

16. A control method executed by a wireless base station, the control method comprising:
establishing a communication connection with a wireless communication device;
controlling in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the communication is not performed with the wireless communication device has passed the first time; and
obtaining the number of the communication terminals having a wireless communication connection established with the wireless communication device in a case where the wireless communication device is the wireless relay device, wherein
in a case where the wireless communication device is the wireless relay device, the controlling includes
setting a timer value for comparison with the time during which the wireless base station and the wireless communication device do not communicate with each other as a second time which is longer than the first time, and
setting the timer value as a longer value as the number of the communication terminals is higher.

17. A control method executed by a wireless base station, the control method comprising:
establishing a communication connection with a wireless communication device;
controlling in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the communication is not performed with the wireless communication device has passed the first time; and determining whether the communication terminal having the wireless communication connection established with the wireless communication device is present in a case where the wireless communication device is the wireless relay device, wherein the controlling includes controlling in a manner that, in a case where the wireless communication device is the wireless relay device and also the communication terminal having the wireless communication connection established with the wireless communication device is present, the connection with the wireless communication device is not released even when the time during which the communication is not performed with the wireless communication device has passed the first time, and in a case where the wireless communication device is the wireless relay device and also the communication terminal having the wireless communication connection established with the wireless communication device is absent, the connection with the wireless communication device is released in response to a state where the time during which the communication is not performed with the wireless communication device has passed the first time.

18. A control method executed by a wireless base station, the control method comprising:

establishing a communication connection with a wireless communication device;

controlling in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the communication is not performed with the wireless communication device has passed the first time; and obtaining a type of the communication terminal having the wireless communication connection established with the wireless communication device in a case where the wireless communication device is the wireless relay device, wherein the controlling includes controlling in a manner that, in a case where the wireless communication device is the wireless relay device and also the type of the communication terminal is a predetermined type, the connection with the wireless communication device is not released even when the time during which the communication is not performed with the wireless communication device has passed the first time, and in a case where the wireless communication device is the wireless relay device and also the type of the communication terminal is not the predetermined type, the connection with the wireless communication device is released in response to a state where the time during which the communication is not performed with the wireless communication device has passed the first time.

19. A control method executed by a wireless base station, the control method comprising:

establishing a communication connection with a wireless communication device;

controlling in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the communication is not performed with the wireless communication device has passed the first time; and obtaining operation status of the communication terminal having the wireless communication connection established with the wireless communication device in a case where the wireless communication device is the wireless relay device, wherein the controlling includes controlling in a manner that, in a case where the wireless communication device is the wireless relay device and also the operation status of the communication terminal is a predetermined state, the connection with the wireless communication device is not released even when the time during which the communication is not performed with the wireless communication device has passed the first time, and in a case where the wireless communication device is the wireless relay device and also the operation status of the communication terminal is not the predetermined state, the connection with the wireless communication device is released in response to a state where the time during which the communication is not performed with the wireless communication device has passed the first time.

20. A control method executed by a wireless base station, the control method comprising:

establishing a communication connection with a wireless communication device;

controlling in a manner that, in a case where the wireless communication device is a wireless relay device having a relay function for relaying a communication between the wireless base station and a communication terminal, a connection with the wireless communication device is not released even when a time during which a communication is not performed with the wireless communication device has passed a first time, and in a case where the wireless communication device is not the wireless relay device, the connection with the wireless communication device is released in response to a state where the time during which the communication is not performed with the wireless communication device has passed the first time; and obtaining operation status of the wireless communication device in a case where the wireless communication device is the wireless relay device, wherein the controlling includes controlling in a manner that, in a case where the wireless communication device is the wireless relay device and also the operation status of the wireless communication device is a predetermined state, the connection with the wireless communication device is not released even when the time during which the communication is not performed with the wireless communication device has passed the first time, and in a case where the wireless communication device is the wireless relay device and also the operation status of the wireless communication device is not the predetermined state, the connection with the wireless communication device is released in response to a state where the time during which the communication is not performed with the wireless communication device has passed the first time.

* * * * *